United States Patent
Kim et al.

(10) Patent No.: US 9,775,106 B2
(45) Date of Patent: *Sep. 26, 2017

(54) MOBILE TERMINAL APPARATUS FOR AUTOMATICALLY GENERATING/CHANGING WIRELESS LOCAL AREA NETWORK (WLAN) ACCESS INFORMATION AND METHOD FOR CONTROLLING THE SAME

(71) Applicant: Samsung Electronics Co., Ltd., Suwon-si, Gyeonggi-do (KR)

(72) Inventors: Jai-Dong Kim, Seoul (KR); Jai-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,363

(22) Filed: Sep. 9, 2016

(65) Prior Publication Data
US 2016/0381628 A1 Dec. 29, 2016

Related U.S. Application Data

(63) Continuation of application No. 14/980,758, filed on Dec. 28, 2015, which is a continuation of application (Continued)

(30) Foreign Application Priority Data

Oct. 28, 2002 (KR) .................. 10-2002-0065897

(51) Int. Cl.
*H04W 48/16* (2009.01)
*H04W 48/20* (2009.01)
(Continued)

(52) U.S. Cl.
CPC ...... *H04W 48/16* (2013.01); *G06F 17/30312* (2013.01); *G06F 17/30386* (2013.01);
(Continued)

(58) Field of Classification Search
CPC ..... H04W 84/12; H04W 12/06; H04W 12/08; H04W 48/16; H04W 88/08; H04W 48/20; H04W 36/14; H04W 48/18; H04W 36/08
See application file for complete search history.

(56) References Cited

U.S. PATENT DOCUMENTS 7,082,114 B1  7/2006 Engwer et al.
7,155,167 B1  12/2006 Carty
(Continued)

FOREIGN PATENT DOCUMENTS

JP  2001-069024 A  3/2001
KR  10-2002-0006474 A  1/2002

*Primary Examiner* — Jung Park
(74) *Attorney, Agent, or Firm* — Jefferson IP Law, LLP (57) ABSTRACT

A method and apparatus for automatically generating/changing Wireless Local Area Network (WLAN) access information are provided. The apparatus includes an access information management database for storing pre-registered WLAN access information of a plurality of WLAN Access Points (APs). The apparatus also includes an access information collector for collecting information for WLAN APs being accessible at a current position of the apparatus, and an access information analyzer for analyzing the collected information, and creating a list of the accessible WLAN APs. The apparatus further includes a comparator for comparing the list with the WLAN access information to determine if the WLAN APs match. The apparatus additionally includes an access information automatic changer for automatically changing current WLAN access information according to matched APs. The apparatus includes an access information generator for automatically generating new
(Continued)

WLAN access information when no WLAN access information is matched with the APs.

16 Claims, 8 Drawing Sheets

Related U.S. Application Data

No. 12/947,405, filed on Nov. 16, 2010, now Pat. No. 9,232,464, which is a continuation of application No. 10/439,653, filed on May 16, 2003, now abandoned.

(51) Int. Cl.
*G06F 17/30* (2006.01)
*H04W 74/00* (2009.01)
*H04W 84/12* (2009.01)
*H04W 88/08* (2009.01)

(52) U.S. Cl.
CPC ...... *G06F 17/30876* (2013.01); *H04W 48/20* (2013.01); *H04W 74/00* (2013.01); *H04W 84/12* (2013.01); *H04W 88/08* (2013.01)

(56) References Cited

U.S. PATENT DOCUMENTS

| | | | |
|---|---|---|---|
| 7,277,547 B1 | 10/2007 | Delker et al. | |
| 7,508,799 B2 | 3/2009 | Sumner et al. | |
| 7,606,242 B2 | 10/2009 | Whelan et al. | |
| 7,702,775 B2* | 4/2010 | Kuan | H04L 12/26 370/252 |
| 2001/0023446 A1* | 9/2001 | Balogh | H04W 48/18 709/229 |
| 2002/0022483 A1 | 2/2002 | Thompson et al. | |
| 2002/0025810 A1* | 2/2002 | Takayama | H04W 48/20 455/432.1 |
| 2003/0058827 A1 | 3/2003 | Chow et al. | |
| 2004/0066759 A1 | 4/2004 | Molteni et al. | |

\* cited by examiner

| AP MAC ADDRESS | IP INFORMATION |
|---|---|
| 00:01:02:98:8A:63 | 165.210.130.121 |
| ⋮ | ⋮ |

MOBILE TERMINAL APPARATUS FOR AUTOMATICALLY GENERATING/CHANGING WIRELESS LOCAL AREA NETWORK (WLAN) ACCESS INFORMATION AND METHOD FOR CONTROLLING THE SAME

CROSS-REFERENCE TO RELATED APPLICATION(S)

This application is a continuation of prior application Ser. No. 14/980,758, filed on Dec. 28, 2015, which is a continuation of prior application Ser. No. 12/947,405, filed on Nov. 16, 2010, which has issued as U.S. Pat. No. 9,232,464 on Jan. 5, 2016; which was a continuation of prior application No. Ser. No. 10/439,653, filed on May 16, 2003, which claimed the benefit under 35 U.S.C §119(a) of a Korean patent application filed on Oct. 28, 2002 in the Korean Intellectual Property Office and assigned Serial number 10-2002-0065897, the entire disclosure of which is hereby incorporated by reference.

BACKGROUND OF THE INVENTION

1. Field of the Invention

The present invention relates to a mobile terminal apparatus for automatically generating/changing WLAN (Wireless Local Area Network) access information and a method for controlling the same, and more particularly to a mobile terminal apparatus for automatically generating/changing WLAN access information of a user's mobile terminal when the user of a WLAN moves from one place to another to provide the user with maximum mobility, resulting in greater convenience for the user, and a method for the controlling the same.

2. Description of the Related Art

With the increasing development of the next generation wired/wireless integrated technologies, many developers have conducted intensive research into WLAN (Wireless Local Area Network) architecture serving as a major component of next generation communication architectures based on such wired/wireless integrated technologies. It is expected that IT (Internet Technology) industries will rapidly change with the development of such WLAN technologies. Particularly, the WLAN architecture has been developed for use with a variety of mobile terminals such as notebook computers and PDAs (Personal Digital Assistants), with the result that an overall service area of the WLAN has become wider and more diverse.

Figure 1:
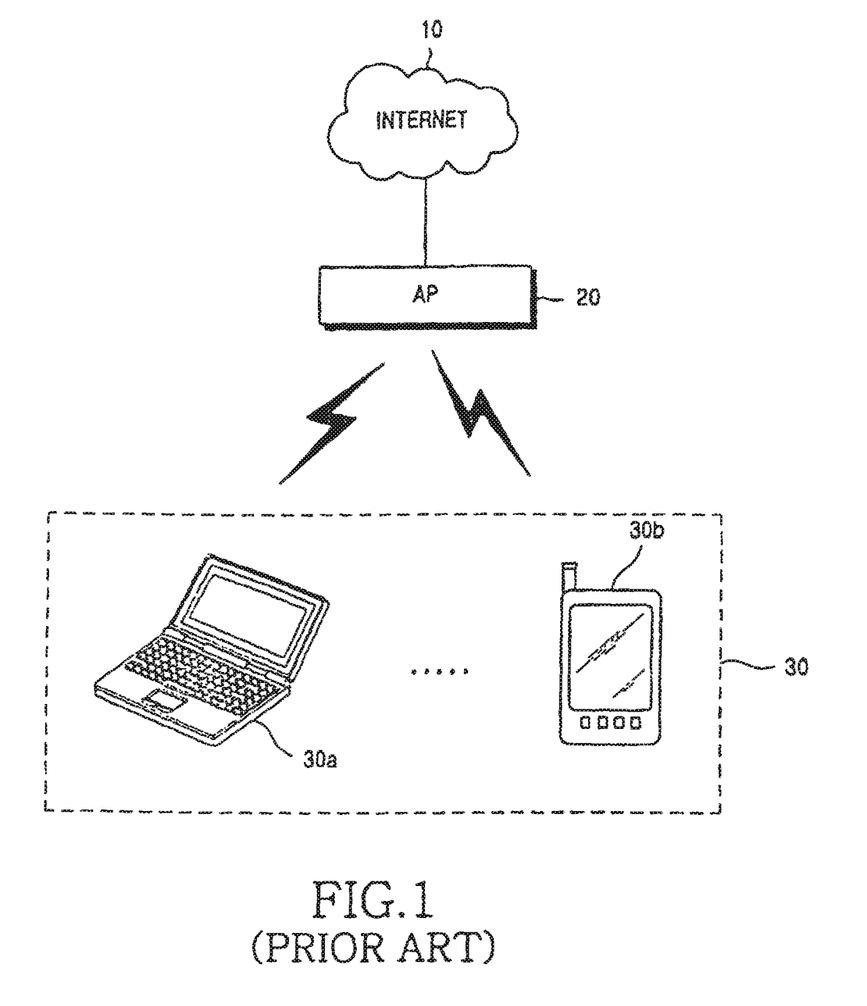
FIG. 1 is a conceptual view illustrating a conventional WLAN architecture.

FIG. 1 is a conceptual view illustrating a conventional WLAN architecture. Referring to FIG. 1, the conventional WLAN architecture includes an AP (Access Point) 20 hardwired to Internet 10. Mobile terminal devices 30 such as a notebook computer 30a or a PDA 30b can wirelessly communicate with the AP 20.

The AP 20 connects a wired LAN with a wireless LAN to enable any user of the mobile terminal devices 30 to freely surf the Internet 10, and operates over a distance in the range of 20~30 m in an internal environment, or over a distance in the range of 100~150 m in an external environment. The AP 20 can be wirelessly connected either to mobile terminal devices 30 for use in buildings where the devices 30 are located within a radius of about 20~30 m from the installation area of AP 20, or to other mobile terminal devices 30 for use outside where the devices 30 are located within a radius of about 100~150 m from the installation area of AP 20. To move from one location to another, a WLAN user must change WLAN access information of the mobile terminal devices 30 to be classified according to WLAN service request areas and their APs; however, this may seriously limit expansion of a serviceable area of the WLAN for guaranteeing the user a free access thereto.

For example, in the case where the WLAN user moves to his or her office after accessing the WLAN at home, he or she must change prescribed WLAN access information of his or her mobile terminal to another WLAN access information for the office area, resulting in inconvenience to the user.

To solve this problem, conventional WLAN users have manually pre-registered WLAN access information (for example, AP setup information related to the WLAN and TCP/IP-related information) of prescribed areas they frequently use in their mobile terminal devices, such that they manually select their desired WLAN access information from among the pre-registered WLAN access information whenever they move from one place to another place in a WLAN service area.

Figure 2:
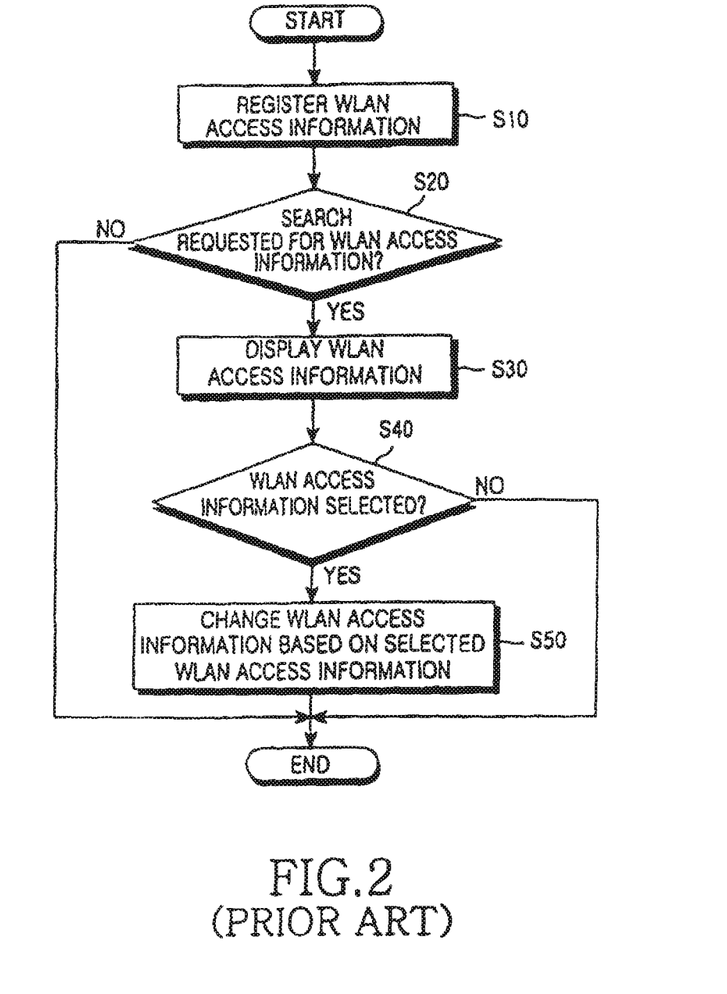
FIG. 2 is a flow chart illustrating a conventional WLAN access information setup procedure.

FIG. 2 is a flow chart illustrating a conventional WLAN access information setup procedure.

Referring to FIG. 2, a user registers prescribed regional information of a plurality of areas he or she wishes in his or her mobile terminal at step S10. In this case, the regional information registered in the user's mobile terminal includes AP setup information for use in regional APs and network setup information of any mobile terminal adapted to access the APs. In the case where the user requests to search for the pre-registered WLAN access information at step S20 after moving from an initial area to another area, a plurality of WLAN access information pre-registered at step S10 are displayed on a display of his or her mobile terminal at step S30. If the user selects one WLAN access information related to any area he or she wishes from among the plurality of WLAN access information at step S40, the user's mobile terminal changes its current WLAN access information to another access information on the basis of the selected WLAN access information at step S50.

Although the aforesaid conventional WLAN access information setup procedure shown in FIG. 2 has an advantage in that it reduces the user's inconvenience of manually entering appropriate regional WLAN access information in his or her mobile terminal whenever the user moves from one place to another place, other disadvantages still remain, that is, the user must pre-register a plurality of WLAN access information in his or her mobile terminal and must manually change prior WLAN access information to another WLAN access information for his or her desired area whenever he or she moves from one area to another area. Moreover, in the event that the user moves to another place not pre-registered in the mobile terminal, it is necessary for the user to manually enter new WLAN access information in the mobile terminal.

SUMMARY OF THE INVENTION

Therefore, it is an object of the present invention to provide a mobile terminal apparatus for automatically generating/changing WLAN access information of a user's mobile terminal when the user of a WLAN moves from one place to another place to afford the user maximum mobility, and a method for the controlling the same.

In accordance with one aspect of the present invention, the above and other objects can be accomplished by the provision of a mobile terminal apparatus. The mobile terminal apparatus includes an access information management database (DB) for storing pre-registered Wireless Local Area Network (WLAN) access information of a plurality of WLAN Access Points (APs) for service positions of a plurality of WLANs accessible by the mobile terminal apparatus. The apparatus also includes an access information collector for collecting information for one or more WLAN APs being accessible at a current position of the mobile terminal apparatus, and an access information analyzer for analyzing the collected information of the access information collector, and creating a list of the one or more WLAN APs accessible at the current position of the mobile terminal apparatus based on the analysis. The apparatus further includes a comparator for comparing the list of the one or more WLAN APs with the WLAN access information stored in the access information management DB to determine if the one or more WLAN APs match the plurality of WLAN APs. The apparatus additionally includes an access information automatic changer for automatically changing a current WLAN access information of the mobile terminal apparatus into other WLAN access information corresponding to one or more matched APs in accordance with a result of the comparing in the comparator. The apparatus includes an access information generator for automatically generating new WLAN access information to automatically change the current WLAN access information when no WLAN access information is matched with the APs contained in the list of the one or more WLAN APs in accordance with the result of the comparing in the comparator.

In accordance with another aspect of the present invention, there is provided a method for automatically generating/changing WLAN (Wireless Local Area Network) access information. An access information management database (DB) is constructed for storing WLAN access information of a plurality of WLAN Access Points (APs) for service positions of a plurality of WLANs accessible by a mobile terminal apparatus. Information of all WLAN APs being accessible at a current position of the mobile terminal apparatus is collected on the basis of a prescribed access information collection condition. The collected information is analyzed, and a list of one or more WLAN APs accessible at the current position of the mobile terminal apparatus is created based on the analysis. The list of the one or more WLAN APs is compared with WLAN access information stored in the access information management DB to determine if the one or more WLAN APs match the plurality of WLAN APs. Current WLAN access information of the mobile terminal apparatus is automatically changed to another WLAN based on WLAN access information matched with the one or more WLAN APs. New WLAN access information is automatically generated when there is no WLAN access information matched with the one or more WLAN APs in the access information management DB. WLAN access information of the mobile terminal apparatus is automatically changed on the basis of the new WLAN access information generated.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE EMBODIMENTS OF THE PRESENT INVENTION

Embodiments of the present invention will be described below in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Figure 3:
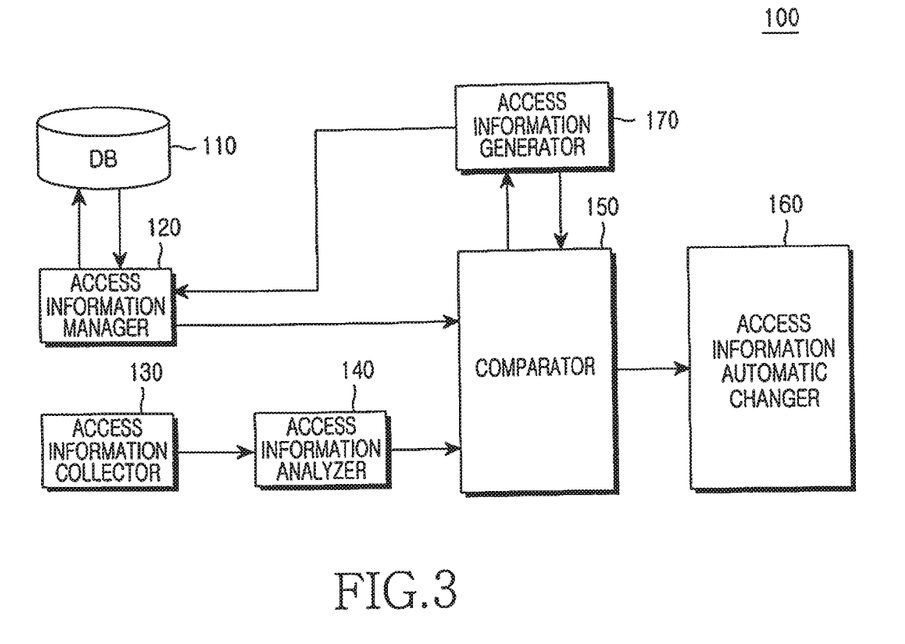
FIG. 3 illustrates a block diagram of a mobile terminal device in accordance with an embodiment of the present invention.

FIG. 3 is a view illustrating a block diagram of a mobile terminal device in accordance with an embodiment of the present invention. Referring to FIG. 3, the mobile terminal device 100 includes an access information management database (DB) 110, an access information manager 120, an access information collector 130, an access information analyzer 140, a comparator 150, an access information automatic changer 160, and an access information generator 170. The mobile terminal device 100 may include other features and components, such as a display, a key entry unit, etc., even though they are not shown in FIG. 3.

The access information management DB 110 stores pre-registered WLAN access information of the mobile terminal device 100. In more detail, a user of the mobile terminal device 100 commands the access information management DB 110 to store prescribed WLAN access information (for example, AP setup information related to the WLAN and TCP/IP-related information) pre-registered for his or her desired area.

The access information manager 120 manages the access information management DB 110 upon receiving external commands. For example, the access information manager 120 transmits to the comparator 150 WLAN access information stored in the access information management DB 110 upon receiving a request signal from the comparator 150, or receives WLAN access information newly generated from the access information generator 170 for storage in the access information management DB 110.

The access information collector 130 collects all the information of all the WLAN APs available at a current position of the mobile terminal device 100. In more detail, an operating condition of the access information collector 130 may be selectively changed/set up by either a user or a manufacturer of the mobile terminal device 100. For example, the access information collector 130 may be set up to operate at a prescribed time at which the mobile terminal device 100 is reset or starts operating, or may be set up to operate when the mobile terminal device 100 moves to another place. The mobile terminal device 100 analyzes in real time a value of field intensity received from its own AP. In this case, if the reception field intensity value is outside of a predetermined or prescribed reference range of the reception field intensity, i.e., if the reception field intensity is lower than a reference field intensity value, it is determined that the mobile terminal device 100 has moved from its current place to another place. As another example, if there occurs any overload in the AP to which the mobile terminal device 100 is connected, the mobile terminal device 100 may set up the access information collector 130 to change a current AP to another accessible AP. Therefore, the mobile terminal device 100 analyzes in real time the amount of load of the AP. If the amount of load of the AP is outside of a predetermined or prescribed reference range, it is determined that an overload in the AP has occurred. Also, the mobile terminal device 100 may set up the access information collector 130 to operate in either one or both of the above cases.

In the meantime, information collected by the access information collector 130 includes among other things, a MAC (Media Access Control) address, a SSID (Service Set IDentifier), reception intensity, transfer rate, and WEP (Wired Equivalent Privacy) setup information.

The access information analyzer 140 analyzes the information collection result of the access information collector 130, and generates a list of WLAN APs accessible at a current position of the mobile terminal device 100 on the basis of the analyzed result. For instance, provided that WLAN APs accessible at a current position of the mobile terminal device 100 are set to AP#1, AP#2, and AP#3, the list of APs is created using a MAC-address of each AP as a key signal.

The comparator 150 compares the list of APs transmitted from the access information analyzer 140 to the comparator 150 with WLAN access information stored in the access information management DB 110, such that it can determine whether there is a matching AP between the list of APs and the WLAN access information.

Upon receiving the result of such comparison from the comparator 150, the access information automatic changer 160 automatically changes WLAN access information of the mobile terminal device 100 on the basis of WLAN access information matched with any AP contained in the list of APs.

In the case where there is no WLAN access information matched with an AP contained in the list of APs, the access information generator 170 automatically generates new WLAN access information. In more detail, the access information generator 170 combines one wired network information among a plurality of wired network information pre-registered in the mobile terminal device 100 with information of a prescribed AP among a plurality of APs contained in the list of APs, and thereby automatically generates new WLAN access information. For this operation, the access information generator 170 selects at least one AP having a prescribed condition, such as, for example, whether the reception field intensity of the mobile terminal device 100 as determined from information transmitted from the AP, or the amount of the AP's load, is in a prescribed reference range, from among the APs contained in the list of APs. In other words, the access information generator 170 generates new WLAN access information on the basis of the information of the selected APs. The access information generator 170 transmits the new WLAN access information to the comparator 150, such that current WLAN access information of the mobile terminal device 100 is automatically changed to another WLAN access information on the basis of the new WLAN access information by the access information automatic changer 160. The access information generator 170 additionally registers such automatically generated WLAN access information in the access information management DB 110 over the access information manager 120.

Figure 4A:
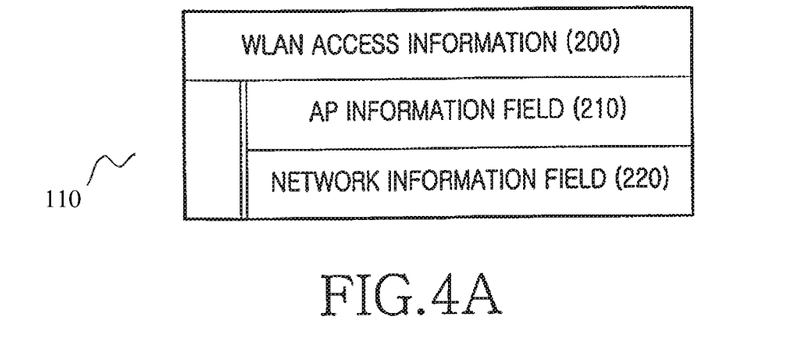
FIG. 4A illustrates a database configuration of the mobile terminal device shown in FIG. 3 in accordance with an embodiment of the present invention.

FIG. 4A is a view illustrating a database configuration of the mobile terminal device 100 shown in FIG. 3 in accordance with an embodiment of the present invention. Referring to FIG. 4A, WLAN access information 200 stored in the access information management DB 110 includes an AP information field 210 and a network information field 220 of any terminal.

The AP information field 210 stores setup information of any AP which is connected to the Internet by wire and provides WLAN service for mobile terminal devices located within a prescribed distance range. In more detail, representative examples of such AP setup information stored in the AP information field 210 are a MAC address of each AP, a SSID (Service Set IDentifier), reception intensity, transfer rate, and WEP (Wired Equivalent Privacy) setup information, etc.

The network information field 220 stores network information of mobile terminal device 100 corresponding to any AP stored in the AP information field 210. Representative examples of such network information stored in the network information field 220 are an IP address of the mobile terminal device 100, gateway information, a subnet mask, and DNS (Domain Name Server) information, etc.

Figure 4B:
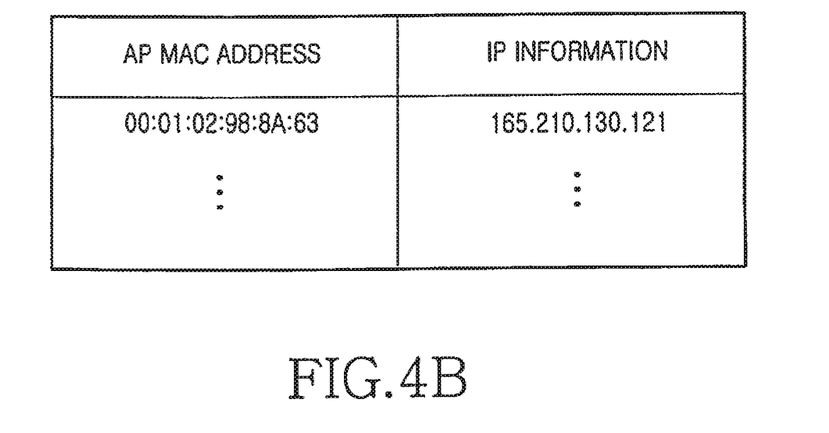
FIG. 4B illustrates a storage configuration of WLAN access information in accordance with an embodiment of the present invention.

FIG. 4B is a view illustrating a storage configuration of WLAN access information having the database configuration shown in FIG. 4a in accordance with an embodiment of the present invention. Referring to FIG. 4b, an AP MAC address such as '00:01:02:98:8A:63' and IP information such as '165.210.130.121' are stored in the database as WLAN access information, and the AP MAC address is matched with the IP information.

Figure 5:
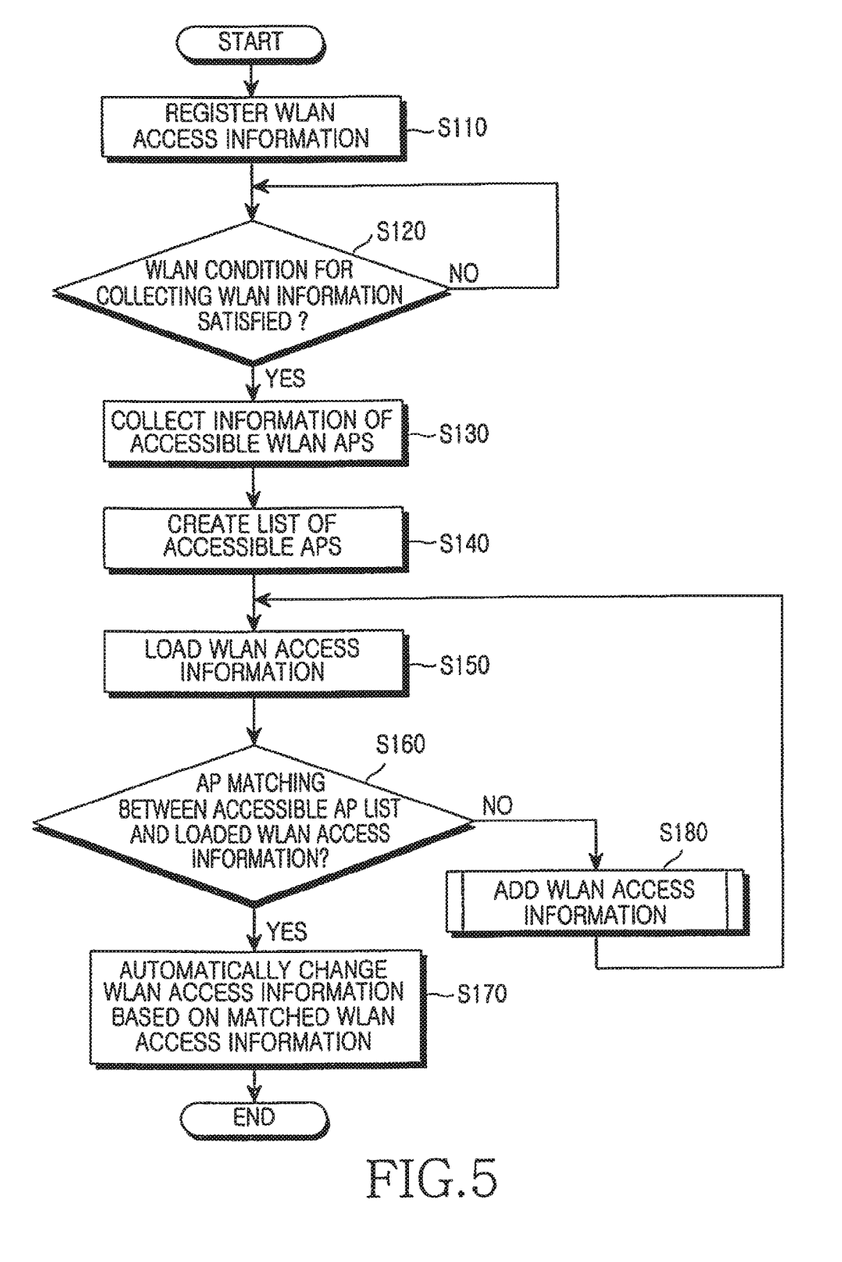
FIG. 5 is a flow chart illustrating a procedure for automatically generating WLAN access information in accordance with an embodiment of the present invention.

FIG. 5 is a flow chart illustrating a procedure for automatically generating WLAN access information in accordance with an embodiment of the present invention. Referring to FIGS. 3 to 5, a method for automatically generating/changing WLAN access information will hereinafter be described in more detail.

The mobile terminal device 100 constructs access information management DB 110 for storing WLAN access information therein at step S110. In more detail, a user registers prescribed information of several areas he or she wishes in his or her mobile terminal device 100 at step S110. The user utilizes a data input device such as a keypad (not shown) of the mobile terminal device 100 to enter his or her desired information at step S110. In this case, the information registered in the user's mobile terminal device 100 includes AP setup information for use in regional APs and network setup information of the mobile terminal device 100 connected to the APs. A representative example of the access information management DB 110 constructed at step S110 is shown in FIG. 4A.

In this way, if the access information management DB 110 is constructed at step S110, then the mobile terminal device 100 determines at step S120 whether a prescribed condition for collecting WLAN access information is satisfied. The prescribed condition for collecting the WLAN access information may be selectively changed/set up by either a user or a manufacturer of the mobile terminal device 100. This prescribed condition for collecting WLAN access information collection is similar to the aforesaid condition of the access information collector 130 shown in FIG. 3. That is, the operating condition of the access information collector 130 is determined depending on reset or booting information of the mobile terminal device 100, position change information of the mobile terminal device 100, and overload information of the mobile terminal device 100. Detailed descriptions thereof will herein be omitted because they are similar to those of the access information collector 130 shown in FIG. 3.

In the case where the mobile terminal device 100 satisfies the prescribed condition for collecting WLAN access information at step S120, information of all the WLAN APs being accessible at a current position of the mobile terminal device 100 is collected at step S130. The access information analyzer 140 analyzes the collected information, and creates the list of WLAN APs being accessible at a current position of the mobile terminal device 100 at step S140.

Then, the mobile terminal device 100 loads at step S150 WLAN access information configured and registered in the access information management DB 110 at step S110, and compares at step S160 the WLAN access information with the list of APs created at step S140. In more detail, the comparator 150 determines at step S160 whether there is a matching AP between the WLAN access information and the list of APs.

If it is determined at step S160 that there is such a matching AP between the WLAN access information and the list of APs, the access information automatic changer 160 automatically changes WLAN access information of the mobile terminal device 100 on the basis of the WLAN access information matched with any AP contained in the APs' list at step S170. Otherwise, in the case where there is no matching AP between the WLAN access information and the APs' list, the access information generator 170 adds new WLAN access information to current WLAN access information at step S180, i.e., automatically creates new WLAN access information at step S180, and then the process returns to step S150. Therefore, at steps S150~S170, WLAN access information of the mobile terminal device 100 is automatically changed on the basis of the WLAN access information created at step S180.

Figure 6:
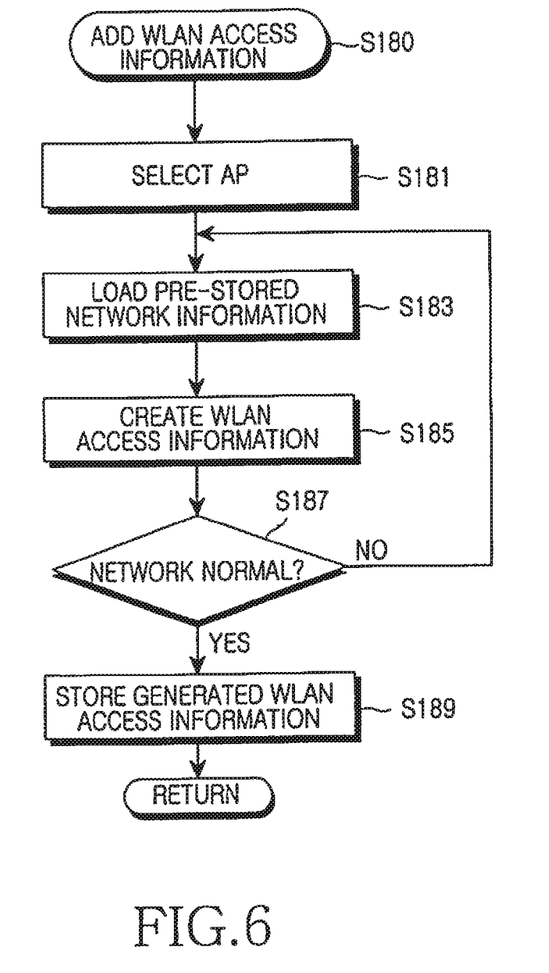
FIG. 6 is a flow chart illustrating a procedure for adding WLAN access information to current WLAN access information in accordance with an embodiment of the present invention.

FIG. 6 is a flow chart illustrating a procedure S180 for adding WLAN access information to current WLAN access information in accordance with an embodiment of the present invention. With reference to FIGS. 3 and 6, the access information generator 170 selects one AP from among APs contained in the APs' list at step S181 to add WLAN access information to current WLAN access information. For example, the access information generator 170 selects at least one AP having a prescribed condition wherein either reception field intensity of the mobile terminal device 100 is within a prescribed range on the basis of information transmitted from the AP, or the amount of the AP's load is in a prescribed reference range, from among the APs contained in the APs' list. Then, one arbitrary network information among a plurality of the network information stored in the mobile terminal device 100 is loaded at step S183. In this case, the network information is stored in a prescribed storage position or memory of the mobile terminal device 100, in a known manner.

If prescribed preparations for generating WLAN access information are provided as the above, the access information generator 170 combines the one AP selected at step S181 with network information loaded at step S183, and thereby automatically creates new WLAN access information at step S185. Thereafter, it is determined at step S187 whether a network status between the mobile terminal device 100 and the APs is normal on the basis of the new WLAN access information created at step S185.

If it is determined at step S187 that a network status between the mobile terminal device 100 and the APs is abnormal, steps S183~S187 for generating the successive WLAN access information are repeated. Otherwise, if it is determined at step S187 that a network status between the mobile terminal device 100 and the APs is normal, the WLAN access information created at step S185 is additionally stored in the access information management DB 110 at step S189.

A method for automatically generating/changing WLAN access information according to the present invention will hereinafter be described with reference to FIGS. 7~8 for better understanding of the present invention.

Figure 7:
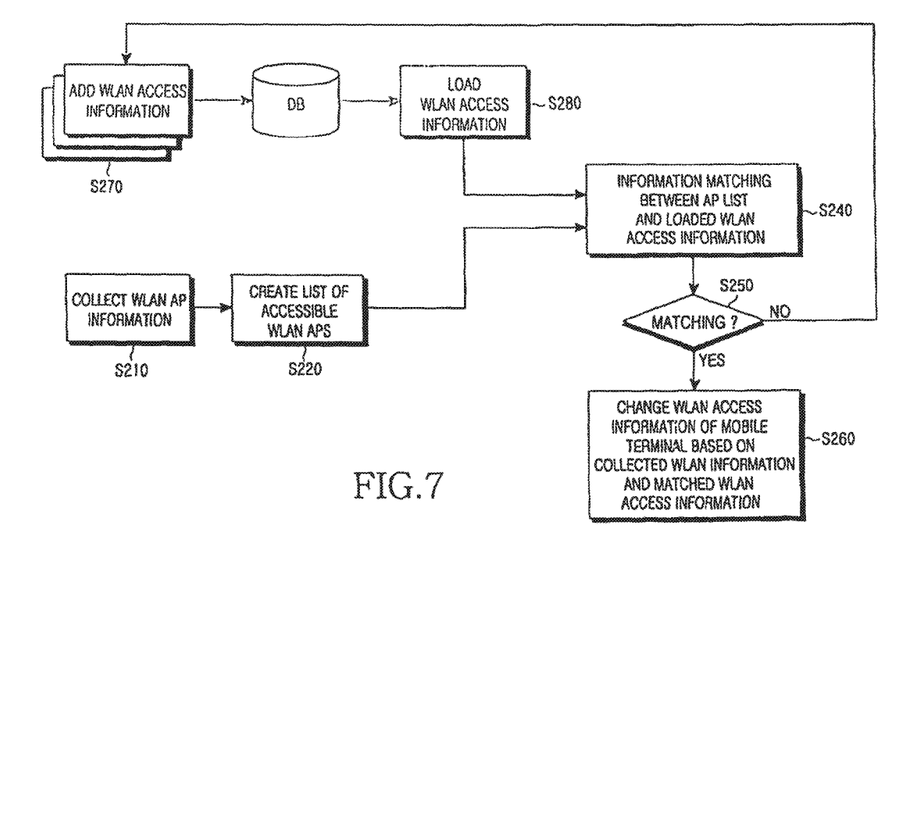
FIG. 7 is a flow chart illustrating a procedure for automatically changing a current WLAN access information to another WLAN access information in accordance with an embodiment of the present invention.

FIG. 7 is a flow chart illustrating a procedure for automatically changing WLAN access information to another information in accordance with an embodiment of the present invention. Steps S210~S280 shown in FIG. 7 respectively correspond to steps S130~S170 shown in FIG. 5. In more detail, step S210 of FIG. 7 corresponds to step S130 of FIG. 5, step S220 of FIG. 7 corresponds to step S140 of FIG. 5, steps S240~S250 of FIG. 7 correspond to step S160 of FIG. 5, step S260 of FIG. 7 corresponds to step S170 of FIG. 5, step S270 of FIG. 7 corresponds to step S180 of FIG. 5, and step S280 of FIG. 7 corresponds to step S150 of FIG. 5, such that their detailed description will herein be omitted.

Figure 8:
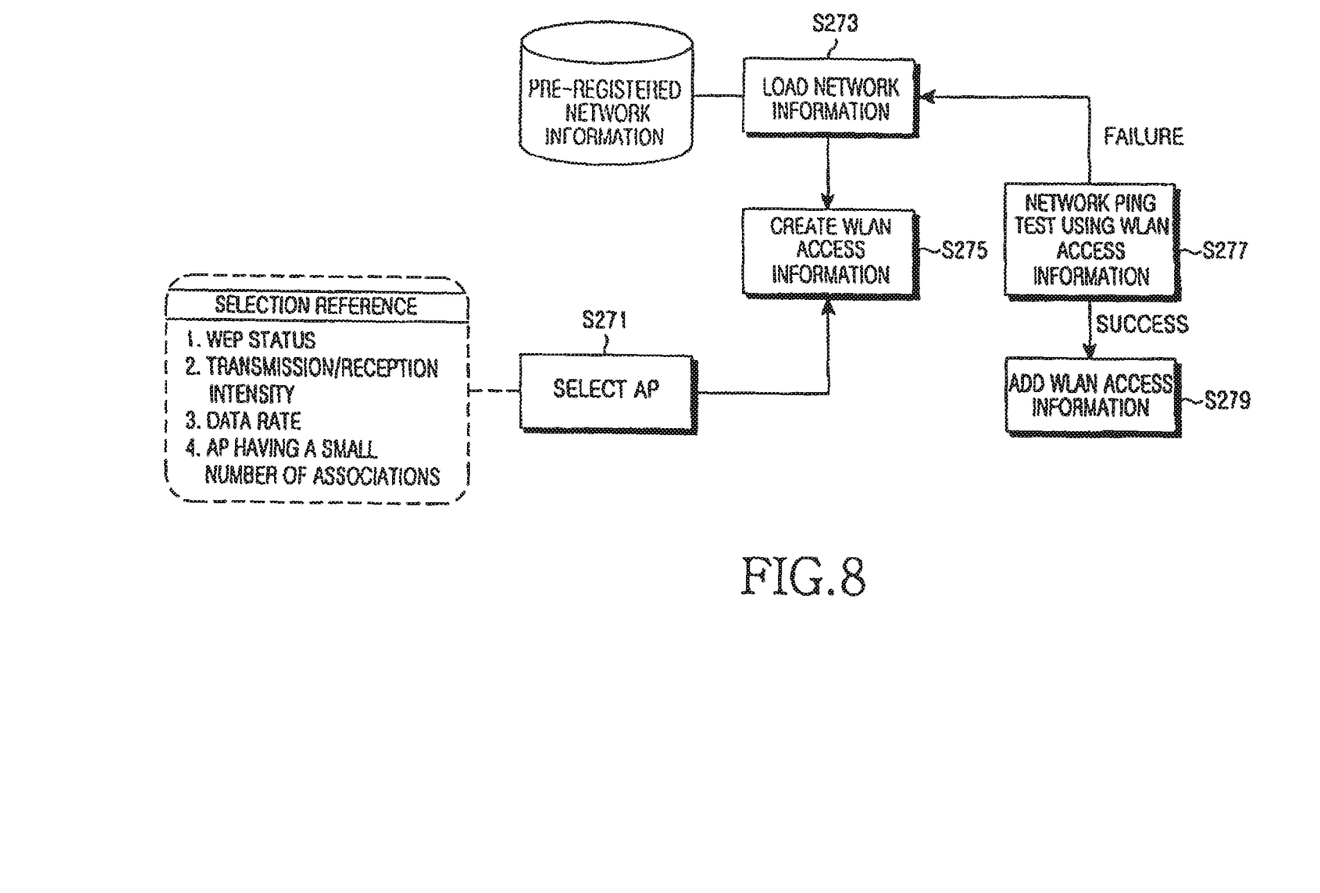
FIG. 8 is a flow chart illustrating a procedure for adding WLAN access information to current WLAN access information in accordance with an embodiment of the present invention.

FIG. 8 is a flow chart illustrating a procedure for automatically generating WLAN access information in accordance with an embodiment of the present invention.

Steps S271~S279 of FIG. 8 respectively correspond to steps S181~S189 of FIG. 6. In more detail, step S271 of FIG. 8 corresponds to step S181 of FIG. 6, step S273 of FIG. 8 corresponds to step S183 of FIG. 6, step S275 of FIG. 8 corresponds to step S185 of FIG. 6, step S277 of FIG. 8 corresponds to step S187 of FIG. 6, and step S279 of FIG. 8 corresponds to step S189 of FIG. 6, such that their detailed description will hereinafter be omitted. Particularly, a prescribed condition for selecting any AP at step S271 is shown in FIG. 8. In this case, the AP is selected based on a WEP (Wired Equivalent Privacy) status, transmission/reception intensity, data rate, and the number of serviceable associations. Particularly, the lower the number of serviceable associations, the better the AP status.

As is apparent from the above description, a mobile terminal apparatus and a method for controlling the same according to the present invention automatically generate/ change WLAN access information of a user's mobile terminal device when the user of a WLAN moves from one place to another place, such that the user can freely use the WLAN without setting up an additional process in his or her preferred areas. In brief, the present invention guarantees maximum mobility to the user, and results in greater convenience for the user, resulting in broader application of the WLAN.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for maintaining and utilizing wireless local area network (WLAN) information by an electronic device, the method comprising:
   receiving, by the electronic device, first identification information of a first WLAN access point (AP) from the first WLAN AP;
   automatically adding, by the electronic device, first WLAN information for automatically connecting to the first WLAN AP to a set of WLAN information for automatically connecting to WLAN APs stored in the electronic device, wherein the first WLAN information for automatically connecting to the first WLAN AP is generated by the electronic device based at least on the first identification information received from the first WLAN AP;
   receiving, by the electronic device, second identification information of a second WLAN AP from the second WLAN AP;
   based on the second identification information received from the second WLAN AP and the set of WLAN information including the first WLAN information, identifying second WLAN information included in the set of WLAN information including the first WLAN information; and
   based on the identified second WLAN information included in the set of WLAN information including the first WLAN information, automatically connecting to the second WLAN AP by the electronic device,
   wherein the first identification information of the first WLAN AP received from the first WLAN AP includes a service set identifier (SSID), and
   wherein the set of WLAN information for automatically connecting to WLAN APs includes an SSID and security information.

2. The method of claim 1, wherein the receiving the first identification information comprises:
   receiving a signal from the first WLAN AP; and
   obtaining the first identification information from the received signal.

3. The method of claim 1, wherein the set of WLAN information for automatically connecting to the WLAN APs stored in the electronic device includes information received from each of the WLAN APs.

4. The method of claim 1, wherein the first WLAN AP is different from the second WLAN AP.

5. An electronic device comprising:
   a memory storing instructions; and
   a processor configured to execute the stored instructions to at least:
      control to receive first identification information of a first wireless local area network (WLAN) access point (AP) from the first WLAN AP;
      control to automatically add first WLAN information for automatically connecting to the first WLAN AP to a set of WLAN information for automatically connecting to WLAN APs stored in the electronic device, wherein the first WLAN information for automatically connecting to the first WLAN AP is generated by the electronic device based at least on the first identification information received from the first WLAN AP;
      control to receive second identification information of a second WLAN AP from the second WLAN AP;
      based on the second identification information received from the second WLAN AP and the set of WLAN information including the first WLAN information, control to identify second WLAN information included in the set of WLAN information including the first WLAN information; and
      based on the identified second WLAN information included in the set of WLAN information including the first WLAN information, control to automatically connect to the second WLAN AP,
   wherein the first identification information of the first WLAN AP received from the first WLAN AP includes a service set identifier (SSID), and
   wherein the set of WLAN information for automatically connecting to WLAN APs includes an SSID and security information.

6. The electronic device of claim 5, wherein the processor is configured to execute the stored instructions to control to receive the first identification information by:
   controlling to receive a signal from the first WLAN AP; and
   controlling to obtain the first identification information from the received signal.

7. The electronic device of claim 5, wherein the set of WLAN information for automatically connecting to the WLAN APs stored in the electronic device includes information received from each of the WLAN APs.

8. The electronic device of claim 5, wherein the first WLAN AP is different from the second WLAN AP.

9. A non-transitory computer readable recording medium storing instructions executable by a processor of an electronic device to cause the processor to at least:
   control to receive first identification information of a first wireless local area network (WLAN) access point (AP) from the first WLAN AP;
   control to automatically add first WLAN information for automatically connecting to the first WLAN AP to a set of WLAN information for automatically connecting to WLAN APs stored in the electronic device, wherein the first WLAN information for automatically connecting to the first WLAN AP is generated by the electronic device based at least on the first identification information received from the first WLAN AP;
   control to receive second identification information of a second WLAN AP from the second WLAN AP;
   based on the second identification information received from the second WLAN AP and the set of WLAN information including the first WLAN information, control to identify second WLAN information included in the set of WLAN information including the first WLAN information; and
   based on the identified second WLAN information included in the set of WLAN information including the first WLAN information, control to automatically connect to the second WLAN AP,
   wherein the first identification information of the first WLAN AP received from the first WLAN AP includes a service set identifier (SSID), and
   wherein the set of WLAN information for automatically connecting to WLAN APs includes an SSID and security information.

10. The non-transitory computer readable recording medium of claim 9, wherein the instructions cause the processor to control to receive the first identification information by:

controlling to receive a signal from the first WLAN AP; and controlling to obtain the first identification information from the received signal.

11. The non-transitory computer readable recording medium of claim 9, wherein the set of WLAN information for automatically connecting to the WLAN APs stored in the electronic device includes information received from each of the WLAN APs.

12. The non-transitory computer readable recording medium of claim 9, wherein the first WLAN AP is different from the second WLAN AP.

13. A method for maintaining and utilizing wireless local area network (WLAN) information by an electronic device, the method comprising:

controlling to receive first identification information of a first WLAN point (AP) from the first WLAN AP;

controlling to automatically add first WLAN information for automatically connecting to the first WLAN AP to a set of WLAN information for automatically connecting to WLAN APs stored in the electronic device, wherein the first WLAN information for automatically connecting to the first WLAN AP is generated by the electronic device based at least on the first identification information received from the first WLAN AP;

controlling to receive second identification information of a second WLAN AP from the second WLAN AP;

based on the second identification information received from the second WLAN AP and the set of WLAN information including the first WLAN information, controlling to identify second WLAN information included in the set of WLAN information including the first WLAN information; and based on the identified second WLAN information included in the set of WLAN information including the first WLAN information, controlling to automatically connect to the second WLAN AP, wherein the first identification information of the first WLAN AP received from the first WLAN AP includes a service set identifier (SSID), and wherein the set of WLAN information for automatically connecting to WLAN APs includes an SSID and security information.

14. The method of claim 13, wherein the controlling to receive the first identification information comprises:

controlling to receive a signal from the first WLAN AP; and controlling to obtain the first identification information from the received signal.

15. The method of claim 13, wherein the set of WLAN information for automatically connecting to the WLAN APs stored in the electronic device includes information received from each of the WLAN APs.

16. The method of claim 13, wherein the first WLAN AP is different from the second WLAN AP.

* * * * *